Oct. 27, 1942.  E. R. HARRALL ET AL  2,299,895

FRICTION TESTING MACHINE

Filed Feb. 12, 1941  2 Sheets-Sheet 1

INVENTORS
E.R. HARRALL
J.P. REIS
BY M J Reynolds
ATTORNEY

Oct. 27, 1942.  E. R. HARRALL ET AL  2,299,895
FRICTION TESTING MACHINE
Filed Feb. 12, 1941  2 Sheets-Sheet 2
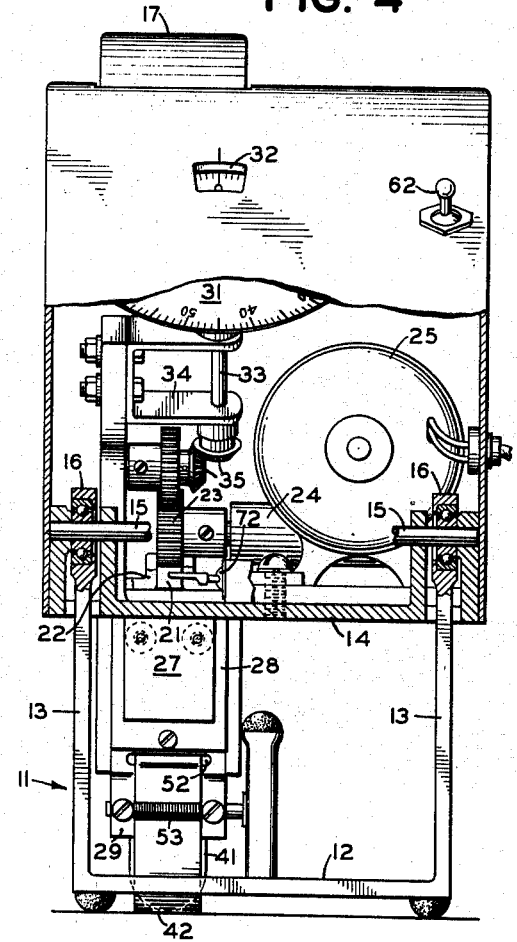
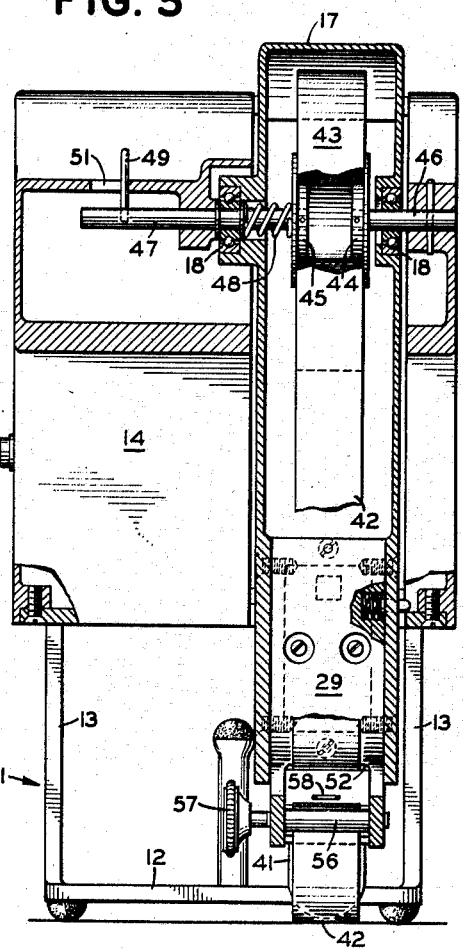
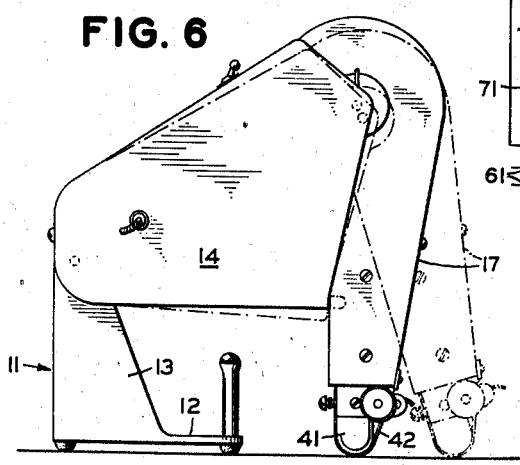
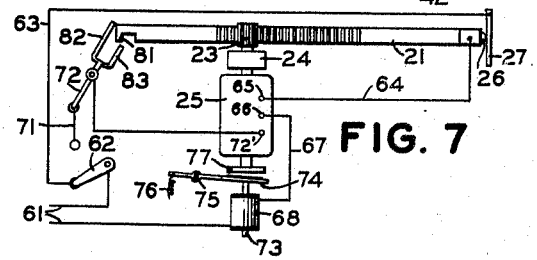
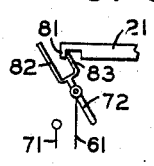
INVENTORS
E. R. HARRALL
J. P. REIS
BY
M. J. Reynolds
ATTORNEY Patented Oct. 27, 1942

2,299,895

UNITED STATES PATENT OFFICE 2,299,895

FRICTION TESTING MACHINE

Edwin R. Harrall, Tenafly, N. J., and John P. Reis, Hempstead, N. Y., assignors to The Western Union Telegraph Company, New York, N. Y., a corporation of New York Application February 12, 1941, Serial No. 378,516

14 Claims. (Cl. 265—10)

This invention relates to machines for testing the friction characteristics of various surfaces such, for example, as waxed floors or the like, and an object is to provide a simple, light weight machine constructed and arranged to determine the comparative slipperiness of different surfaces.

A further object is to provide a friction testing machine having a renewable contact face for engaging the surface to be tested.

A still further object is to provide a machine of the type set forth having a light weight, portable construction which can be easily carried from one place to another.

These and other objects which will be apparent to those skilled in the art are accomplished by the present invention, one embodiment of which is shown in the accompanying drawings in which:

Fig. 4 is a rear elevation looking from the left of Fig. 1, certain parts being broken away;

Fig. 5 is a section on the line 5—5 of Fig. 2;

Fig. 6 is a side elevation on a reduced scale showing in dotted lines the operation of the machine;

Fig. 7 is a wiring diagram showing the control circuit for the operating motor; and Fig. 8 diagrammatically illustrates a switch detail.

Figure 1:
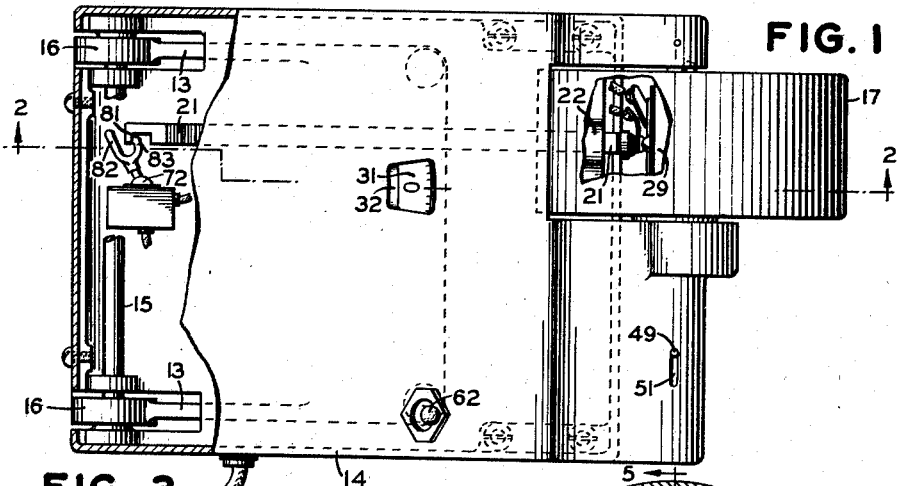
Fig. 1 is a top plan view of a machine constructed in accordance with one embodiment of this invention, a portion of the top cover being broken away to show certain parts.

In the illustrated embodiment of the invention, the machine is shown as including a pivotally mounted frame supported at one side by a leg adapted to rest on the surface to be tested such, for example, as a waxed floor. The angle between this leg and the surface is gradually decreased, causing the leg to incline more and more until the point is reached where the angle between the leg and the surface becomes less than the angle of repose of the leg on the surface, whereupon the horizontal component of the vertical load which the leg sustains causes it to slip suddenly on the surface being tested. This point is automatically indicated on a suitable dial. The readings of the dial are empirical and may be used to compare the friction characteristics of different surfaces, of different parts of the same surface, or the like.

As illustrated, the machine comprises a base member 11, adapted to rest on the surface to be tested, having a foot shelf 12 and vertical side arms 13 pivotally supporting one side of a frame 14 through a supporting shaft 15 extending through bearings 16 in the upper ends of the arms 13, said frame 14 rotating in a vertical plane about said shaft 15. The opposite side of the movable frame 14 is supported by a leg 17 pivotally connected to the frame through bearings 18.

A rack bar 21 is slidably mounted for horizontal movement in guides 22 on the bottom of the frame 14 and is adapted to be reciprocated by a gear 23 meshing therewith and driven through reduction gearing 24 by a reversible electric motor 25 also mounted in the frame. The projecting end of the rack bar has a contact point 26 secured thereto and adapted to engage a contact plate 27 mounted on the leg 17 and insulated therefrom by an insulating sheet 28 secured to a block 29 rigidly fastened to the leg. Obviously, outward movement of the rack bar will force the leg 17 outwardly, as indicated in Fig. 6, to decrease the angle between the leg and the surface being tested. The extent of this movement is indicated on a dial 31, visible through an opening 32 in the top of the frame and mounted on the end of a shaft 33 rotatably supported in a bracket 34 and driven from the rack driving pinion 23 through gearing 35.

The surface engaging end of the leg 17 has a friction tip arranged to provide a fresh surface-engaging face on each test, or whenever desired. As illustrated, this comprises a ball point 41 of any suitable material, preferably carborundum, secured to the bottom of the leg. The surface-engaging face is formed by a strip 42 of suitable material, preferably oiled paper. A strip supply reel 43 is rotatably supported on centers 44 and 45 mounted on shafts 46 and 47 supported in the bearings 18 connecting the leg 17 to the movable frame 14. One center shaft 47 is longitudinally movable to permit an exhausted reel being removed and a fresh reel substituted. A spring 48 presses it into reel engaging position and a finger 49 extending through a slot 51 in the frame wall permits retraction of the movable center 45. The strip extends downwardly through the leg and passes through a slot 52 in the block 29, then downwardly under a spring guide 53 extending across the face of the strip between supporting screws 54 mounted in the block 29, then under the tip 41 and upwardly through gripping rollers 55, one of which has a surface 56 of friction material and a thumb wheel 57. A guide plate 58, see Fig. 2, guides the strip outwardly in position to be cut off after use.

The circuit for controlling the machine is illustrated in Fig. 7. Current is supplied from a line 61 through one side of a double throw switch 62 and conductor 63 to the contact plate 27 on the leg 17. The contact tip 26 on the rack bar 21 which is adapted to make contact with leg plate 27 is connected by a conductor 64 to one side 65 of the motor 25, the center terminal 66 of which is connected by conductor 67 through a motor brake-controlling solenoid 68 back to line. The opposite side of the double throw switch 62 is connected by a conductor 71 and a rack controlled toggle switch 72 to the opposite side 72' of the motor 25.

The solenoid core 73 is connected to a braking disc 74 of leather or other suitable material pivoted at 75 and biased by a spring 76 to engage a brake drum 77 on the motor shaft when the solenoid is deenergized.

Figure 2:
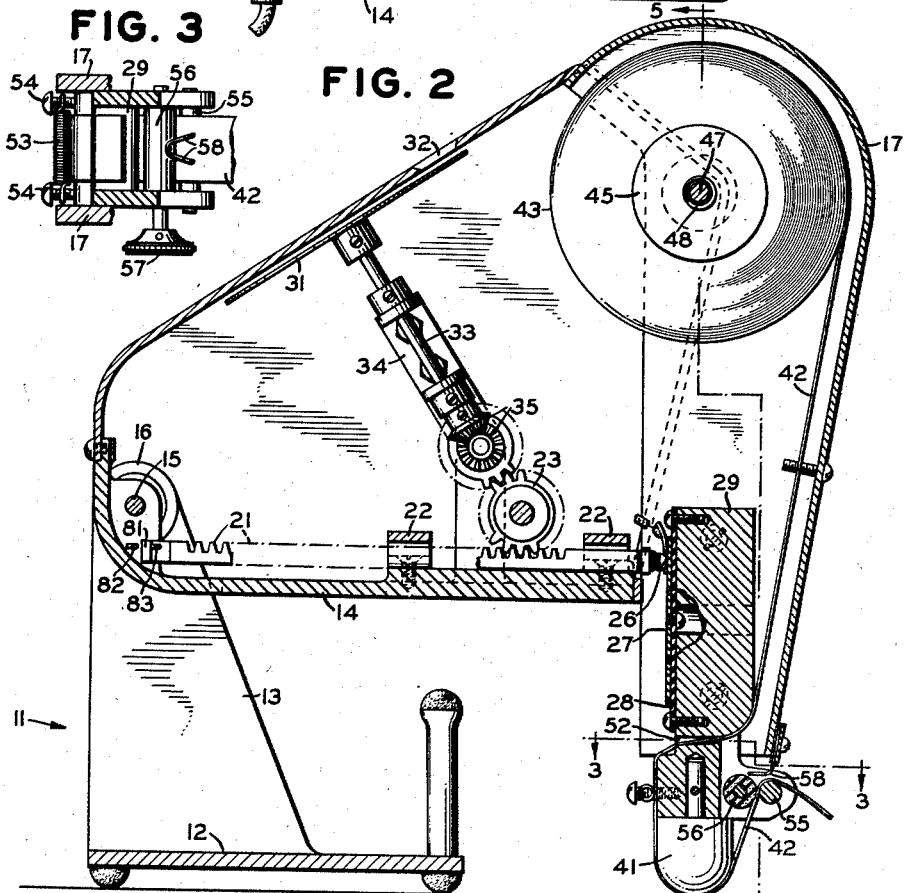
Fig. 2 is a transverse section on the line 2—2 of Fig. 1.

In operation, assuming that it is desired to test the friction characteristics of, for example, a waxed floor, the machine is placed on the floor. Assuming that the rack bar 21 is retracted and the leg 17 is in a substantially perpendicular position, as shown in Fig. 2, and in solid lines in Fig. 6, a fresh floor-engaging face is provided on the ball point 41 by drawing out a section of the strip 42 by operating thumb wheel 57. The operator places his foot on the foot shelf 12 of the supporting base 11 to hold it firmly in place on the floor against the push of the machine, and throws the switch 62 for forward operation of the motor 25. The contact tip 26 of the rack bar and the contact plate 27 of the leg being in contact, current flows through the motor and the brake solenoid 68, withdrawing the braking disc 74 from the drum 77 to permit the motor to move the rack bar longitudinally and push the leg outwardly, as indicated in dotted lines in Fig. 6. This operation gradually decreases the angle between the leg and the floor surface until the point is reached at which the horizontal component of the vertical load on the leg, caused by the weight of the vertically movable frame 14, causes the tip to slip suddenly on the surface and the leg to move away from the frame. This movement separates the contact plate 27 on the leg from the contact point 26 on the rack bar, opening the motor circuit, deenergizing the brake solenoid 68 and permitting the instantaneous application of the brake disc 74 to the drum 77 on the motor shaft under the force of the spring 76. As a result, the motor is stopped at the instant the leg 17 begins to slip on the surface being tested as a result of the inclination thereof and the weight of the frame thereon.

At the beginning of the operation the dial 31 registered zero, as shown in Fig. 4. During the operation the dial was rotated by the gear 23 which caused the rack bar to move. Hence, the resulting movement of the dial indicates the relative amount of movement of the rack bar, or the relative angle between the leg and the surface being tested, necessary to produce slip on the surface. The dial readings for the different operations are empirical and give comparative data on the friction characteristics of different surfaces or different sections of the same surface.

Figure 3:
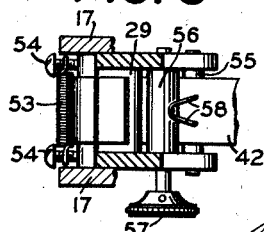
Fig. 3 is a section on the line 3—3 of Fig. 2.

After a surface has been tested the rack bar can be returned to its starting position by throwing the switch 62 to the opposite side. The toggle switch being closed as shown in Fig. 7, the motor is operated in reverse, the brake solenoid being energized to release the brake. When the rack bar has returned to starting position a pin 81 on the end of the bar engages an arm 82 of the toggle switch 72 snapping it into the position shown in Figs. 1 and 3, opening the motor circuit, deenergizing the solenoid and permitting application of the motor brake. Upon starting the next operation, the pin 81 engages a second arm 83 to close the toggle switch in readiness for the next return operation.

The gear reduction unit 24 is preferably such as to provide a gear reduction of about 1,000 to 1, and the motor is operated at about 7,000 R. P. M.

The oiled paper strip 42 constitutes a renewable surface which is new for each test. It is relatively impervious to moisture and assures a constant contact face at all times. Also, the carborundum ball point assures the paper strip being held firmly in place, the fine hard granules of the carborundum cutting into the paper, but not through it. The ball point gives a relatively small, uniform, circular contact area with a pressure of approximately 400 pounds per square inch assuring uniformity of operation. Other materials can, of course, be used, but the construction described is preferred.

It will be understood that many modifications and changes can be made in the structure and circuit arrangements shown without departing from the essential attributes of the invention, and we contemplate all such changes within the scope of the appended claims.

What is claimed is:

1. A friction testing machine comprising a supporting frame, a depending member pivotally secured to said frame and subject to a load and adapted to rest on and be positioned at a predetermined angle to the surface to be tested, means for moving said member to progressively decrease the angle between said member and said surface, means for indicating the point at which said angle becomes less than the angle of repose of the member on said surface, and means controlled by the movement of said member for actuating said indicating means.

2. A friction testing machine comprising a supporting frame, a depending member pivotally secured to said frame and adapted to rest on and be positioned substantially perpendicular to a surface to be tested, means for progressively decreasing the angle between said member and said surface, means for indicating the point at which said angle becomes less than the angle of repose of the member on said surface, and means controlled by the movement of said member for actuating said indicating means.

3. A friction testing machine comprising a supporting frame, a depending member pivotally secured to said frame and subject to a vertical load and adapted to rest on and be positioned substantially perpendicular to the surface to be tested, a surface-engaging friction tip on said member, means for progressively decreasing the angle between said member and said surface, means for indicating the point at which said angle becomes less than the angle of repose of the member on said surface, and means controlled by the movement of said member for actuating said indicating means.

4. A friction testing machine comprising a supporting frame, a depending member pivotally secured to said frame and adapted to rest on and be positioned at a predetermined angle to the surface to be tested, a surface-engaging friction tip on said member, means providing a supply of a renewable surface-engaging material for said tip, means for moving said member to progressively decrease the angle between said member and said surface, means for indicating the point at which said angle becomes less than the angle of repose of the member on said surface, and means controlled by the movement of said member for actuating said indicating means.

5. A friction testing machine comprising a supporting base, a pivotally mounted frame thereon, a leg pivoted to said frame and adapted to engage the surface to be tested, means for decreasing the angle between said leg and surface, means for indicating the point at which said angle becomes less than the angle of repose of the leg on said surface, and means controlled by the movement of said leg for actuating said indicating means.

6. A friction testing machine comprising a supporting base, a movable frame supported at one end on said base, a surface engaging leg pivotally secured to and supporting the other end of said frame and adapted to rest on and be positioned at a predetermined angle to the surface to be tested, means for decreasing the angle between said leg and surface means for indicating the point at which said angle becomes less than the angle of repose of the leg on said surface, and means controlled by the movement of said leg for actuating said indicating means.

7. A friction testing machine comprising a supporting base, a pivotally mounted frame supported at one side on said base, a surface engaging leg pivotally secured to and supporting the other side of said frame and adapted to rest on and be positioned substantially perpendicular to the surface to be tested, a surface engaging friction tip on said leg, motor driven means on said frame for moving said tip along said surface to decrease the angle between said leg and said surface, means for stopping the operation of said leg moving means when said angle becomes less than the angle of repose of the leg on said surface, and means for indicating the amount of said movement.

8. A friction testing machine comprising a supporting base, a movable frame supported at one side on said base, a surface engaging leg pivotally secured to and supporting the other side of said frame and adapted to rest on and be positioned at a predetermined angle to the surface to be tested, a surface engaging friction tip on said leg, a horizontally movable rack bar supported on said frame and abutting said leg, a motor for moving said rack bar to cause said tip to move across the surface being tested and decrease the angle between said leg and said surface, a motor controlling switch adapted to open the motor circuit when said rack bar and leg are not in contact, means for stopping said motor when said angle becomes less than the angle of repose of the leg on said surface, and means for indicating the relative amount of movement of said rack bar prior thereto.

9. A friction testing machine comprising a supporting base, a pivotally mounted frame supported at one side on said base, a surface engaging leg pivotally secured to and supporting the other side of said frame and adapted to rest on and be positioned substantially perpendicular to the surface to be tested, a horizontally movable rack bar supported on said frame and abutting said leg, a motor for moving said rack bar to cause the surface engaging end of said leg to move across said surface so as to decrease the angle between said leg and surface until the angle becomes less than the angle of repose of the leg on said surface, a motor control circuit including means for stopping said motor when said condition occurs, and means for indicating the amount of movement occurring prior to the time of said occurrence.

10. A friction testing machine comprising a supporting base, a pivotally mounted frame supported at one side on said base, a surface engaging leg pivotally secured to and supporting the other side of said frame and adapted to rest on the surface to be tested, a horizontally movable rack bar supported on said frame and abutting said leg, a motor for moving said rack bar to cause the surface engaging end of said leg to move across said surface so as to decrease the angle between said leg and surface until said angle becomes less than the angle of repose of the leg on said surface, a motor control circuit including means for stopping said motor when said condition occurs, means for indicating the amount of movement occurring prior to the time of said occurrence, means for reversing said motor to retract said rack to starting position, and means for stopping said motor when said starting position is reached.

11. A friction testing machine comprising a supporting base, a frame supported at one side on said base, a surface engaging leg pivotally secured to and supporting the other side of said frame and adapted to rest on the surface to be tested, a horizontally movable rack bar supported on said frame and abutting said leg, a motor for moving said rack bar to cause the surface engaging end of said leg to move across said surface so as to decrease the angle between said leg and surface until said angle becomes less than the angle of repose of the leg on said surface, a motor control circuit including a motor brake, contacts on said rack bar and leg for controlling said motor and said brake so as to stop said motor when said condition occurs, and means for indicating the amount of movement occurring prior to the time of said occurrence.

12. A friction testing machine comprising a supporting frame, a depending member pivotally secured to said frame and adapted to rest on and be positioned at a predetermined angle to the surface to be tested, a surface-engaging friction tip on said member including a ball point, a layer of material providing a surface-engaging face on said ball point, means for moving said layer relative to said point to provide a fresh surface-engaging face, means for moving said member to progressively decrease the angle between said member and said surface, means for indicating the point at which said angle becomes less than the angle of repose of the member on said surface, and means controlled by the movement of said member for actuating said indicating means.

13. A friction testing machine comprising a supporting frame, a depending member pivotally secured to said frame and adapted to rest on and be positioned at a predetermined angle to the surface to be tested, a surface-engaging friction tip on said member including a ball point, a roll of strip material, means for holding said strip material in position on said point to provide a surface-engaging face thereon, means for feeding said strip across said point to provide a fresh surface-engaging face, means for moving said member to progressively decrease the angle between said member and said surface, means for indicating the point at which said angle becomes less than the angle of repose of the member on said surface, and means controlled by the movement of said member for actuating said indicating means.

14. A friction testing machine comprising a supporting frame, a depending member pivotally secured to said frame and adapted to rest on and be positioned at a predetermined angle to the surface to be tested, a surface-engaging friction tip on said member including a carborundum ball point, a strip of oiled paper providing a surface-engaging face on said point, means for feeding said strip across said point to provide a fresh surface-engaging face thereon, means for moving said member to progressively decrease the angle between said member and said surface, means for indicating the point at which said angle becomes less than the angle of repose of the member on said surface, and means controlled by the movement of said member for actuating said indicating means.

EDWIN R. HARRALL.
JOHN P. REIS.